US00RE48136E

(19) United States
(12) Reissued Patent
Czarnek

(10) Patent Number: US RE48,136 E
(45) Date of Reissued Patent: Aug. 4, 2020

(54) PILL DISPENSING METHOD AND APPARATUS

(71) Applicant: Czarnek & Orkin Laboratories, Inc., Highland Park, IL (US)

(72) Inventor: Robert Czarnek, Johnstown, PA (US)

(73) Assignee: Czarnek & Orkin Laboratories, Inc., Highland Park, IL (US)

(21) Appl. No.: 15/922,305

(22) Filed: Mar. 15, 2018

Related U.S. Patent Documents

Reissue of:
(64) Patent No.: 9,283,149
Issued: Mar. 15, 2016
Appl. No.: 14/321,857
Filed: Jul. 2, 2014

U.S. Applications:
(63) Continuation-in-part of application No. 13/267,228, filed on Oct. 6, 2011, now Pat. No. 8,794,483.

(60) Provisional application No. 61/390,275, filed on Oct. 6, 2010.

(51) Int. Cl.
*A61J 7/02* (2006.01)

(52) U.S. Cl.
CPC ..... *A61J 7/02* (2013.01)

(58) Field of Classification Search
CPC ..... A61J 7/02
See application file for complete search history.

(56) References Cited

U.S. PATENT DOCUMENTS

| | | | | |
|---|---|---|---|---|
| 2,777,561 | A | 1/1957 | Rose | |
| 3,133,624 | A * | 5/1964 | Craig | 198/443 |
| 3,281,012 | A | 10/1966 | Martell | |
| 3,386,618 | A * | 6/1968 | Gilbert | 221/12 |
| 3,628,694 | A | 12/1971 | Nichols | |
| 3,837,139 | A | 9/1974 | Roseberg | |
| 5,768,327 | A * | 6/1998 | Pinto | G01V 8/20 377/10 |
| 5,884,806 | A | 3/1999 | Boyer et al. | |
| 8,479,476 | B2 | 7/2013 | Baroncini | |
| 2006/0219730 | A1 | 10/2006 | Handfield et al. | |
| 2007/0187422 | A1 | 8/2007 | Handfield et al. | |
| 2007/0235464 | A1 | 10/2007 | Vasquali | |
| 2010/0140287 | A1 | 6/2010 | Richardson et al. | |

* cited by examiner

*Primary Examiner* — Jeffrey L Gellner
(74) *Attorney, Agent, or Firm* — The Webb Law Firm

(57) ABSTRACT

The present invention is a pill dispensing method and apparatus wherein a first rotor rotates pills about a rotation axis along a first part of a spiral path at a first rotational speed whereupon the pills move spirally away from the rotation axis. A second rotor receives the pills from the first rotor and rotates the pills about the rotation axis along a second part of the spiral path at a second, greater rotational speed whereupon the pills move spirally away from the rotation axis toward a discharge chute which dispenses the pills into a pill bottle or a storage container. A counter can be provided for counting pills that exit the discharge chute or opening.

19 Claims, 9 Drawing Sheets

PILL DISPENSING METHOD AND APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application is *a reissue of U.S. patent application Ser. No. 14/321,857, which issued as U.S. Pat. No. 9,283, 149, which is* a continuation-in-part of U.S. patent application Ser. No. 13/267,228, filed Oct. 6, 2011, which claims priority from U.S. Provisional Patent Application No. 61/390,275, filed Oct. 6, 2010, [both] *all* of which are incorporated herein by reference.

BACKGROUND OF THE INVENTION

Pharmacists routinely dispense solid medications following doctor's prescription. Most often they count the pills manually with the aid of a counting tray.

In recent years various devices have come to the market intended to automate the counting process and ensure accuracy of the count. Unfortunately all of them either require human involvement in counting, are not accurate or safe enough, or cannot handle certain shapes or colors of the pills effectively.

SUMMARY OF THE INVENTION

A pill dispensing machine includes a hopper or chute into which pills to be counted are poured from a bulk container. A cassette inside the machine includes a plurality of rotors that move the pills along a spiral path. A gate incorporated into the path of pills exiting the cassette facilitates directing the pills either toward a pill bottle or a storage container.

The rotors are desirably concentric disks, curved bowls or cones. Desirably, the pills are fed onto the central rotor via the chute or hopper. However, in applications where a small number of pills need to be handled, a rotor shaped like a bowl can serve the double purpose of a hopper and a mechanism that feeds the outer rotor(s), the latter of which can be shaped like a disk, a bowl or have a sloped or multi-sloped pill receiving surface.

The use of multiple rotors allows controlled rate of feeding and separation of pills reaching a counter into a single line or queue, thereby preventing miscounts. To separate the pills into a single line or queue, the rotors move at different speeds, with the outer rotor(s) rotating faster than inner rotor(s) thereby facilitating the separation. Radial groves, indentations, or protrusions can be provided in one or more of the rotors to avoid pills from rolling and thereby enabling fast and well controlled movement of pills.

Once the desired number of pills is dispensed into a pill bottle, any remaining pills in the cassette can be returned to the storage container by increasing the speed of the inner rotor(s). Having the outer rotor(s) rotating faster than the inner rotor(s) facilitates separating pills in a single line or queue. However, this approach slows down the feed of the pills when one wants to return remaining pills to the storage container. If the rotors are powered by a single motor through a set of fixed gears, then the speed at which remaining pills can be returned to the storage container is limited by the maximum allowable speed of the outer rotor. However, if the rotors are rotated separately by dedicated motors the speeds of the rotors can be adjusted as needed. During counting of the pills, the speeds of the rotors can be different for different rotors. During the returning of the remaining pills, the speed(s) of the inner rotor(s) can be brought up to the speed of the outermost rotor, maximizing the overall throughput of the machine.

In a flat or planar rotor configuration, pills move preferably along a smooth spiral path. However, a conical or convex rotor configuration desirably defines a stepped spiral path. This latter geometry facilitates tumbling of the pills and therefore forces them to separate if they become stacked. Further, the rotors can be shaped with steps providing additional tumbling action.

More specifically the invention is a pill dispensing machine comprising: a cassette including a first rotor disposed for rotation about a rotation axis, a second rotor disposed for rotation about the first rotor and the rotation axis, and a discharge chute or opening; at least one motor for rotating the first rotor at a first speed and for rotating the second rotor at a second, faster speed; and one or more plates spaced from the first and second rotors and defining therewith a spiral path that extends between a first location at or adjacent the rotation axis and a second location at or adjacent the discharge chute.

The pill dispensing machine can further include means for counting pills exiting the discharge chute or opening. The means for counting can include: a substantially spatially coherent light source and a photodiode positioned on opposite sides of a pill pathway; a collimating lens for collimating light output by the light source and for passing the collimated light to the pill pathway; a focusing lens for focusing light exiting the pill pathway onto the photodiode; and a controller programmed to be responsive to changes in an amount of the focused light received by the photodiode in response to the passage of pills through the collimated light in the pill pathway for accumulating a count of pills that pass through the collimated light in the pill pathway.

The pill dispensing machine can further include: the first rotor having a first density of radial grooves, indentation or protrusions; and the second rotor having a second density of radial grooves, indentations, or protrusions.

The pill dispensing machine can further include each rotor having a conical or convex pill receiving surface that slopes downward in the direction of the discharge chute or opening with greater radial distance from the rotation axis. The pill dispensing machine can further include a step between the conical or convex pill receiving surface of the first rotor and the conical or convex pill receiving surface of the second rotor.

The one or more plates can include a plurality of plates arranged such that the spiral path is a stepped spiral path.

The pill dispensing machine can further include each rotor having a pill receiving surface that is sloped.

The pill dispensing machine can further include a feed chute disposed for feeding pills on the first rotor at the first location of the spiral path.

The invention is also a pill dispensing machine comprising: a plurality of concentric rotors having pill receiving surfaces; at least one motor for rotating the plurality of concentric rotors at different rotational speeds about a rotation axis; and at least one plate spaced from the pill receiving surfaces of the plurality of concentric rotors and defining with said pill receiving surfaces all or part of a spiral path which extends between the innermost rotor and the outermost rotor.

The pill dispensing machine can further include: a discharge chute or opening adjacent the outermost rotor from the rotation axis; and means for counting pills exiting the discharge chute or opening. The means for counting can include: a laser light source and a photodiode positioned on opposite sides of a pill pathway; a collimating lens for collimating light output by the laser light source and for passing the collimated light to the pill pathway; a focusing lens for focusing light exiting the pill pathway onto the photodiode; and a controller responsive to changes in an amount of the focused light received by the photodiode due to the passage of pills through the collimated light in the pill pathway for accumulating a count of pills that pass through the collimated light in the pill pathway.

The pill dispensing machine can further include each rotor having radial grooves, indentations, or protrusions.

The pill dispensing machine can further include each rotor having a different number and/or density of radial grooves, indentations, or protrusions, with each outer rotor having a different number and/or density of radial grooves, indentations, or protrusions than each inner rotor.

The pill dispensing machine can further include the plurality of concentric rotors defining conical or convex pill receiving surfaces that slope downward with greater radial distance from the rotation axis.

The pill dispensing machine can further include a step between each pair of conical or convex pill receiving surfaces.

The pill dispensing machine can include a plurality of plates arranged such that the spiral path is a stepped spiral path.

The pill dispensing machine can further include a feed chute disposed for feeding pills to the rotor radially closest to the rotation axis.

The pill receiving surface of at least one rotor can slope upwardly, downwardly, or both upwardly and downwardly at different points radially from the rotation axis.

Lastly, the invention is a method of pill dispensing comprising: step (a) a first rotor rotating pills about a rotation axis along a first part of a spiral path at a first rotational speed whereupon the pills move spirally away from the rotation axis; and step (b) a second rotor receiving the pills from the first rotor and rotating the pills about the rotation axis along a second part of the spiral path at a second, greater rotational speed whereupon the pills move spirally away from the rotation axis.

The method can further include: step (c), following step (b), feeding the pills to a discharge chute or opening; and step (d), following step (c), accumulating a count of pills that pass through a beam of collimated light.

The method can further include the first and second rotors having pill receiving surfaces that are shaped whereupon the pills also move parallel with the rotation axis (up, down, or both up and down) concurrent with the first and second rotors moving the pills spirally away from the rotation axis.

The method can further include: feeding the pills to the first rotor; and following step (b), feeding the pills to a discharge chute or opening.

The spiral path can be a stepped spiral path whereupon the pills move in a stepped spiral away from the rotation axis.

DETAILED DESCRIPTION OF THE INVENTION

The present invention will now be described with reference to the accompanying figures where like reference numbers correspond to like elements.

Figure 1:
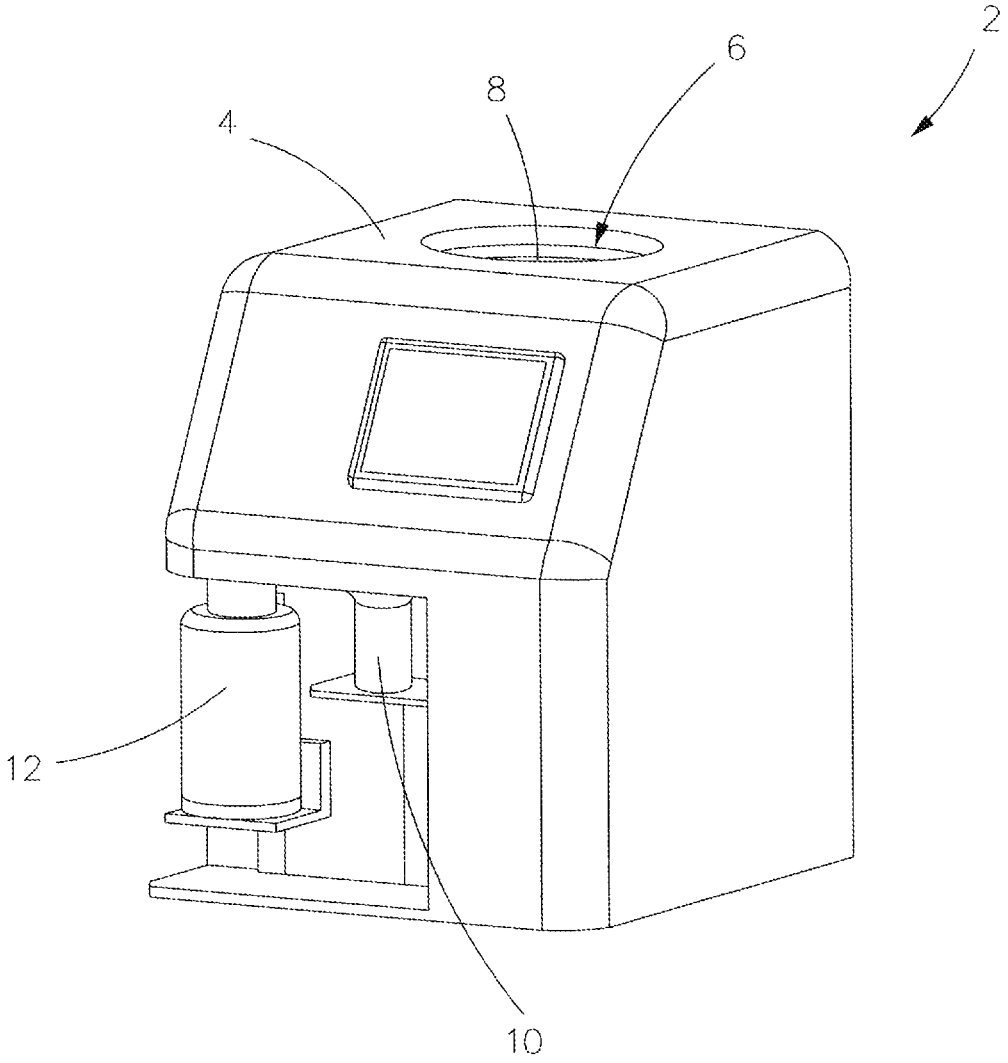
FIG. 1 is a perspective view of a pill dispensing machine that includes in the interior thereof a cassette that is operative for separating pills into a single line or queue.

With reference to FIG. 1, a pill dispensing machine 2 includes a housing 4 having an opening 6 in a top side of housing 4 for feeding pills (not shown) to a chute 8, either directly or via a hopper 9 (FIG. 4A), for processing and counting by pill dispensing machine 2 in a manner described hereinafter and for deposit of the counted pills into a pill bottle 10. Pills in excess of a desired number of pills to be dispensed into pill bottle 10 can be dispensed to a storage container 12.

Figure 2:
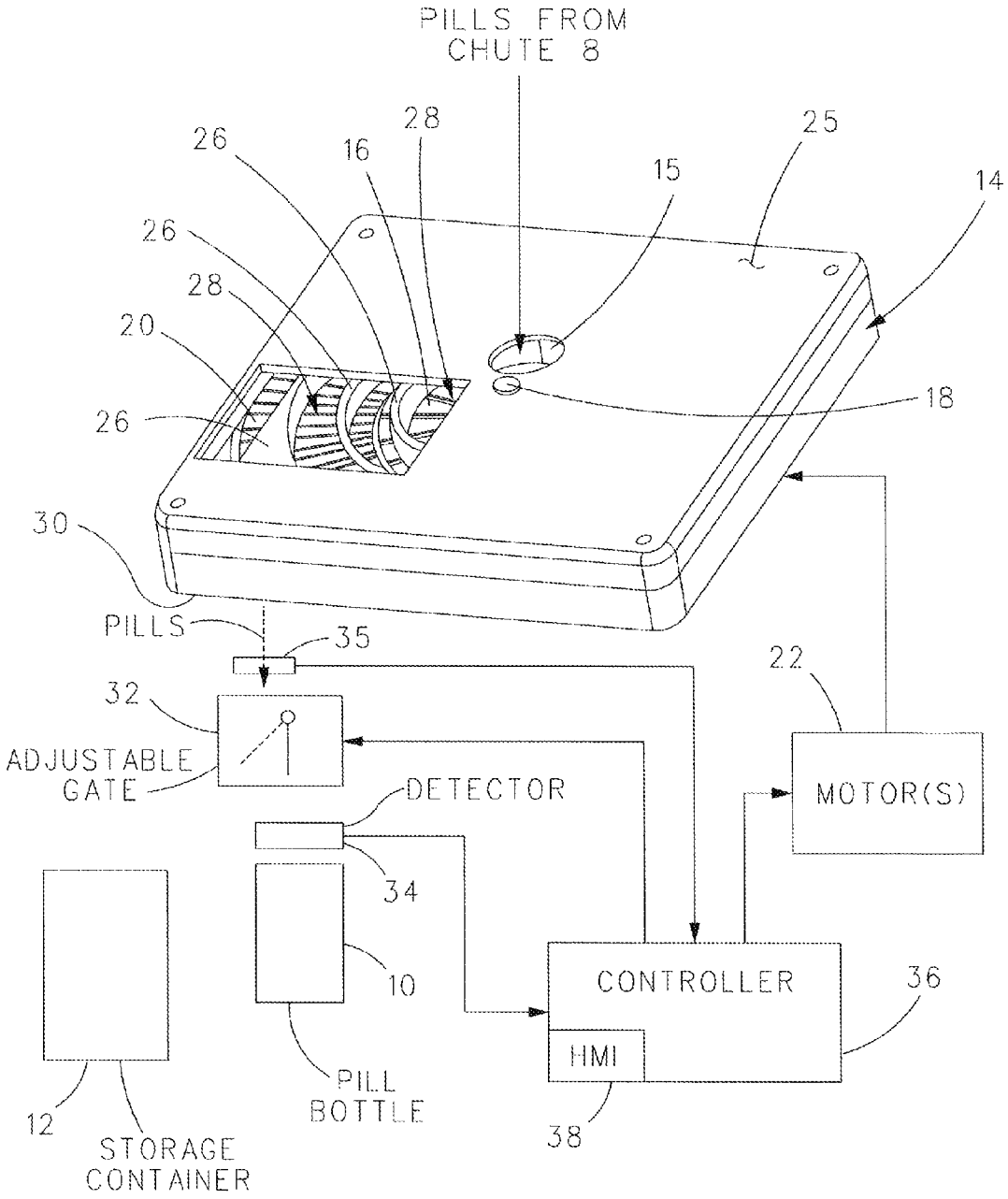
FIG. 2 is a partially open perspective view of a first embodiment cassette that can be utilized with the pill dispensing machine shown in FIG. 1 in operative relation to a block diagram of operationally related components of the pill dispensing machine.
Figure 3:
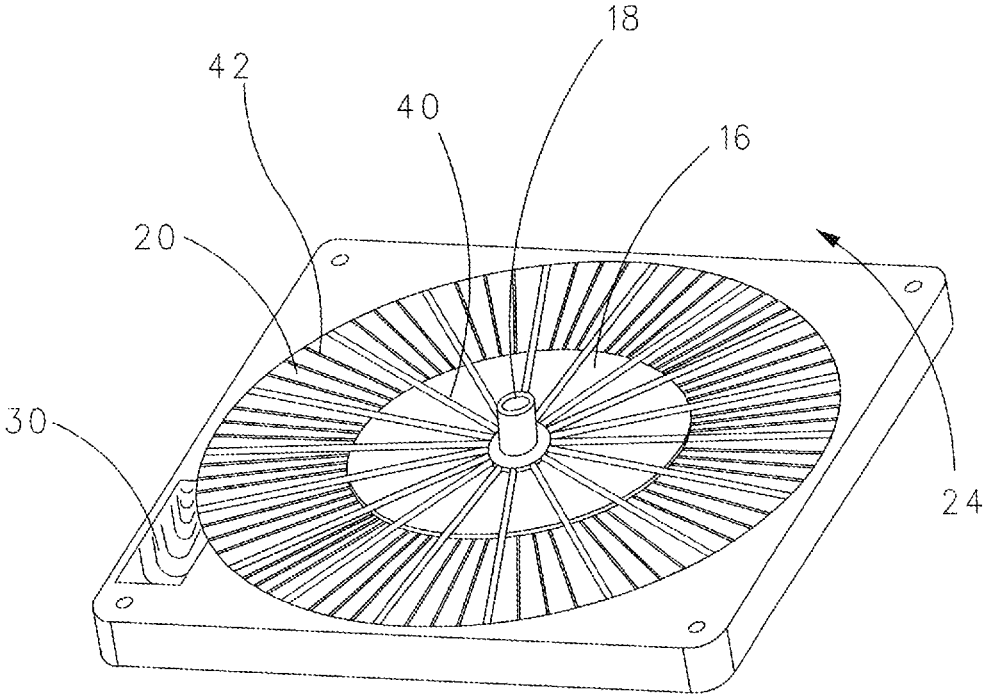
FIG. 3 is an isolated perspective view of the base and two rotors of the first embodiment cassette shown in FIG. 2.

With reference to FIGS. 2 and 3 and with continuing reference to FIG. 1, pill dispensing machine 2 can include first embodiment cassette 14. In FIG. 2, a section of cassette 14 is shown removed for the purposes of illustration.

Cassette 14 includes a first rotor 16 disposed about a rotation axis 18 and a second rotor 20 disposed about first rotor 16 and rotation axis 18. As shown in FIG. 3, first rotor 16 and second rotor 20 are concentric about rotation axis 18.

First rotor 16 and second rotor 20 can be independently rotated about the rotation axis via one or more motors 22. To this end, each rotor 16 and 20 can be rotated separately by dedicated motors, the speeds of which can be adjusted as needed. Alternatively, rotors 16 and 20 can be rotated by a single motor through a set of fixed gears. In the illustrated embodiment, rotors 16 and 20 are rotated in the direction shown by arrow 24. However, this is not to be construed as limiting the invention.

Cassette 14 includes a spiral plate 26 disposed in spaced relation over the pill receiving (or top) surfaces of first and second rotors 16 and 20. Spiral plate 26 is held in spaced relation to first and second rotors 16 and 20 by a cover 25 of cassette 14. The combination of spiral plate 26 and the pill receiving surfaces of first and second rotor(s) 16 and 20 define a spiral path 28 that extends between an opening 15 of cassette 14 adjacent rotation axis 18 and a discharge chute 30 of cassette 14 adjacent the periphery of second rotor 20.

Pill dispensing machine 2 desirably includes an adjustable gate 32 and a detector 34 coupled to a controller 36 which can optionally be coupled to control the one or more motors 22 and, hence, the rotation of first rotor 16 and second rotor 20. Desirably, adjustable gate 32 is controlled by controller 36 to direct pills exiting discharge chute 30 to either pill bottle 10 or storage container 12.

Detector 34 can be any suitable and/or desirable type or form of detector, for example, without limitation, a photodetector, which is capable of detecting when a pill enters pill bottle 10. Detector 34 provides an indication of each pill entering the pill bottle 10 to controller 36 which can, for each pill bottle 10, accumulate a count of the number of pills entering pill bottle 10. Optionally, another detector 35, like detector 34, can be provided between discharge chute 30 and adjustable gate 32 to provide to controller 36 an indication of each pill exiting discharge chute 30. Controller 36 can be programmed to compare the count of pills entering pill bottle 10 provided by detector 34 to the count of pills detected by detector 35 to ensure the accuracy of the count of the number of pills in pill bottle 10. The use of detectors 34 and 35 helps avoid the situation where one detector counts two pills as a single pill but the other detector counts each pill of the two pills separately.

At a suitable time, when a desired number of pills have been dispensed into pill bottle 10, controller can activate adjustable gate 32 to redirect any remaining pills exiting discharge chute 30 to storage container 12. Controller 36 can take the difference between the number of pills counted by detector 35 and the number of pills counted by detector 34 as an indication of the number of pills introduced into storage container 12 after adjustable gate 32 has been set to direct pills exiting discharge chute 30 to storage container 12.

Controller 36 can include a suitable human machine interface (HMI) 38 that enables a user of pill dispensing machine 2 to enter a desired number of pills to be dispensed into pill bottle 10. Following the entry by a user into HMI 38 of the desired number of pills to be dispensed into pill bottle 10, the one or more motors 22 can be activated (either manually or via controller 36) to commence rotation of first and second rotors 16 and 20. Thereafter, in response to the introduction of pills into opening 15 via chute 8, pills are rotated by first and second rotors 16 and 20 in the direction of arrow 24 within the spiral path 28 defined by spiral plate 26 and first and second rotors 16 and 20. In operation, the one or more motors 22 cause first rotor 16 to rotate at a first speed and cause second rotor 20 to rotate at a second, faster speed. Rotating second rotor 20 at a faster speed than first rotor 16 facilitates the separation of pills into a single line or queue and the feeding of the separated pills to discharge chute 30.

Under the control of controller 36, the position of adjustable gate 32 can be controlled to fill pill bottle 10 with the desired number of pills programmed into controller 36 via HMI 38. Detector 34, detector 35, or both enable controller 36 to keep an accurate count of the pills entering pill bottle 10 whereupon, in response to controller 36 determining that the number of pills dispensed into pill bottle 10 equals the desired number of pills to be introduced into pill bottle 10 programmed into controller 36 via HMI 38, controller 36 causes adjustable gate 32 to assume a position (shown in phantom in FIG. 2) whereupon any further pills exiting discharge chute 30 will be directed to storage container 12.

The one or more motors 22 can continue operation for a suitable and/or desirable period of time after filling pill bottle 10 with the desired number of pills to ensure that all of the pills introduced into cassette 14 have exited discharge chute 30.

Optionally, first rotor 16 can have a first number and density of radial grooves, indentations, or protrusions 40 and second rotor 20 can have a second, greater number and/or density of radial grooves, indentations, or protrusions 42. These radial grooves, indentations, or protrusions 40 and 42 avoid round pills from rolling thereby facilitating fast and well-controlled movements of the pills. It is to be appreciated, however, that grooves, indentations, or protrusions 40 and/or 42 are optional.

Figure 4A:
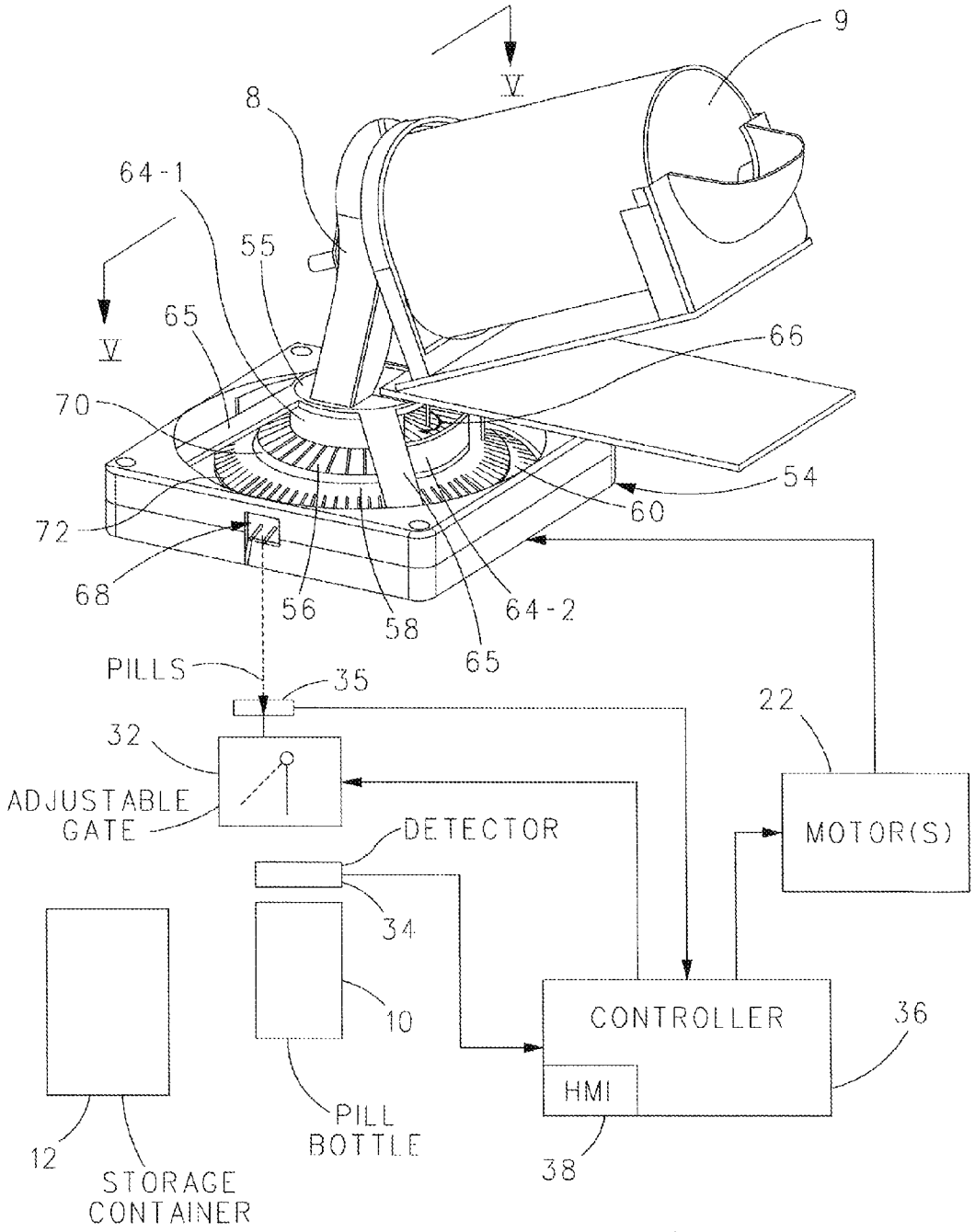
FIG. 4A is a perspective view of a second embodiment cassette that can be utilized with the pill dispensing machine of FIG. 1 in operative relation to a chute and hopper utilized to feed pills to the second embodiment cassette all in operative relation to a block diagram of operationally related components of the pill dispensing machine.
Figure 4B:
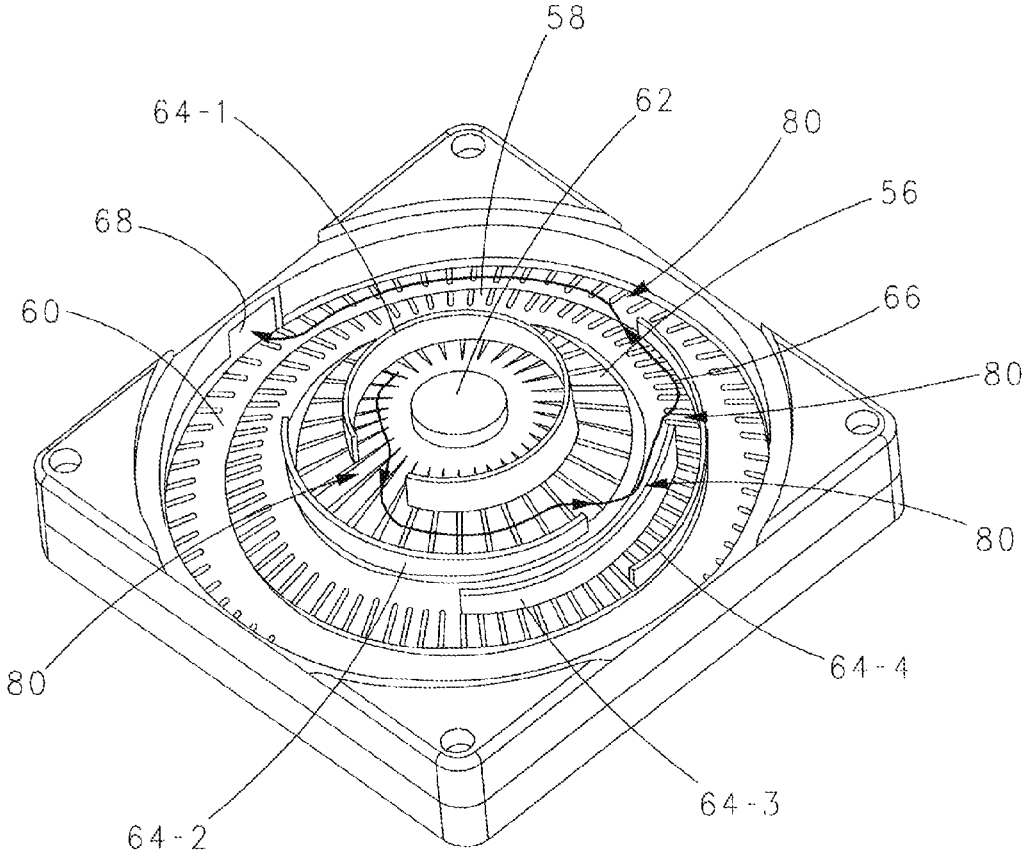
FIG. 4B is an isolated perspective view of the rotors and arcuate plate(s) of the second embodiment cassette of FIG. 4A that, in combination, form a stepped spiral pill path.
Figure 5:
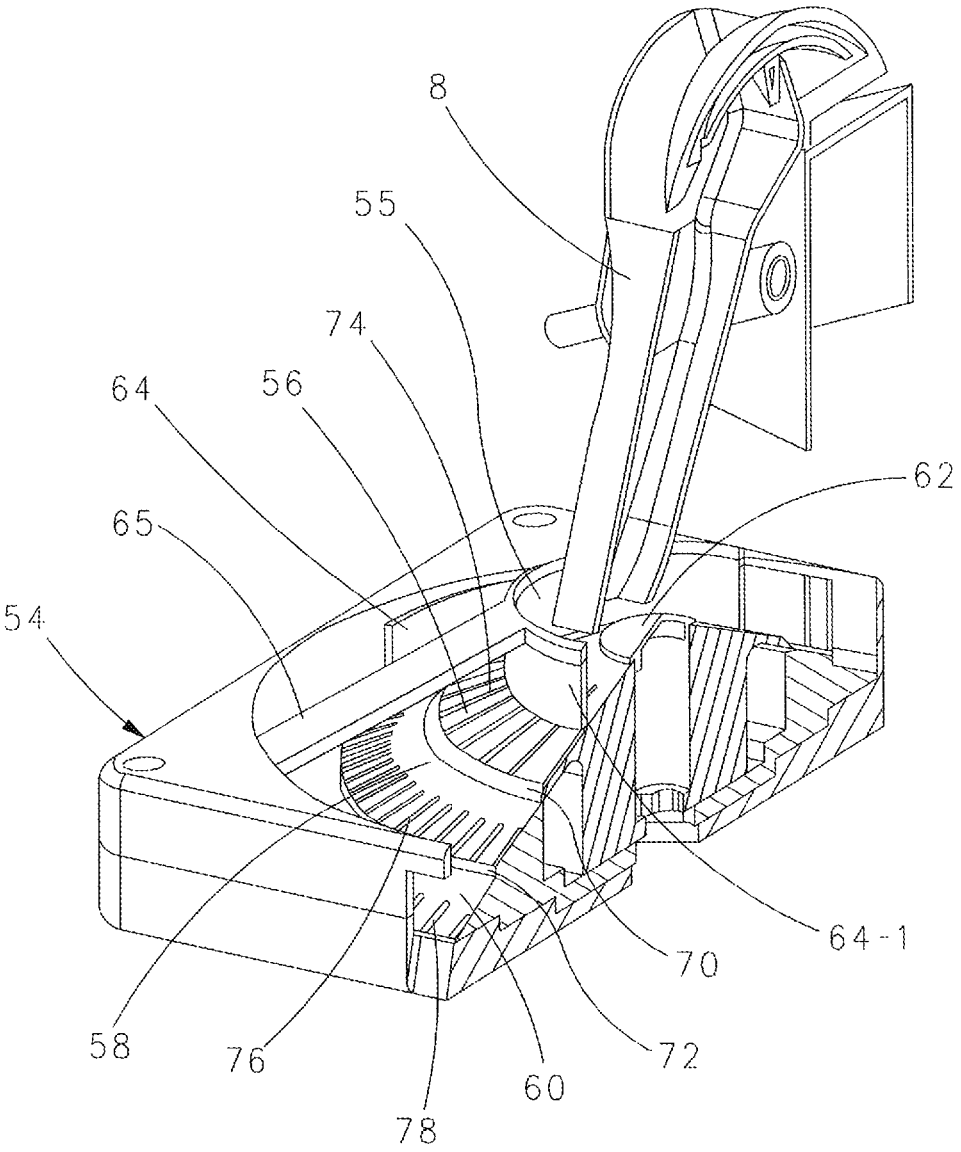
FIG. 5 is a cross section of the second embodiment cassette taken along lines V-V in FIG. 4A.

With reference to FIGS. 4A, 4B, and 5 and with continuing reference to FIGS. 1-3, a second embodiment cassette 54 that can be utilized with pill dispensing machine 2 in replacement of the first embodiment cassette 14 discussed above includes an opening 55 for receiving pills from chute 8. Cassette 54 includes three rotors 56, 58, and 60 disposed concentrically about a rotation axis 62. Under the control of the one or more motors 22, the third, outermost rotor 60 is rotated faster than second, intermediate rotor 58 which, in-turn, is rotated faster than first, innermost rotor 56.

Cassette 54 also includes a plurality of arcuate plates 64-1-64-4 fixedly supported in spaced relation over rotors 56, 58, and 60 by braces 65 (FIG. 4A). The combination of arcuate plates 64-1-64-4 and rotors 56, 58, and 60 define a stepped spiral path 66 that extends between a point adjacent rotation axis 62, e.g., at opening 55, and a discharge opening 68 of cassette 54.

In operation, cassette 54 can replace cassette 14 in pill dispensing machine 2 with discharge opening 68 positioned to dispense pills to adjustable gate 32. Pill dispensing machine 2 can include suitable mechanical guides (not shown) that can be utilized to guide pills dispensed from discharge chute 30 of cassette 14 or discharge opening 68 of cassette 54 to adjustable gate 32. Hence, the location of discharge opening 68 in the center of a wall of cassette 54 and the location of discharge chute 30 in a corner of cassette 14 are not to be construed as limiting the invention.

As shown in FIGS. 4A, 4B, and 5, the pill receiving (top) surfaces of rotors 56, 58, and 60 desirably define conical or convex surfaces that slope downward from opening 55 with greater radial distance from rotation axis 62. Optionally, rotors 56, 58, and 60 can be configured to define a step 70 between first rotor 56 and second rotor 58 and a step 72 between second rotor 58 and third rotor 60.

It is believed that the combination of steps 70 and 72 and the conical or convex pill receiving surfaces of rotors 56, 58, and 60 enhance the capability of cassette 54 to separate pills into a single line or queue for delivery to discharge opening 68.

Desirably, cassette 54 and cassette 14 are interchangeable in pill dispensing machine 2 without affecting the operation of pill dispensing machine 2.

Optionally, rotors 56, 58, and 60 include radial grooves, indentations, or protrusions 74, 76, and 78, respectively, that avoid pills from rolling and therefore facilitate fast and well-controlled movement of the pills. Desirably, the number and/or density of radial grooves, indentations, or protrusions 78 of third rotor 60 is greater than the number and/or density of radial grooves, indentations, or protrusions 76 of second rotor 58 which is greater than the number and/or density of radial grooves, indentations, or protrusions 74 of first rotor 56.

In the embodiment of cassette 54 shown in FIGS. 4A, 4B, and 5, the combination of arcuate plates 64-1-64-1 and the stepped conical surfaces of rotors 56, 58, and 60 and steps 70 and 72 define the steps 80 of stepped spiral path 66. Stepped spiral path 66 facilitates tumbling and separation of pills traveling therealong.

In operation of cassette 54, first rotor 56 rotates pills along a first part of stepped spiral path 66 at a first rotational speed whereupon the pills move stepped spirally and radially away from rotation axis 62. Second rotor 58 receives the pills from first rotor 56 and rotates the pills about rotation axis 62 along a second part of stepped spiral path 66 at a second, greater rotational speed whereupon the pills move stepped spirally and radially away from rotation axis 62. Third rotor 60 receives pills from second rotor 58 and rotates the pills about rotation axis 62 at a third, greater rotational speed than the second rotational speed for discharge from cassette 54 via discharge chute 68. Because of the conical surfaces of rotors 56, 58, and 60, pills traveling along stepped spiral path 66 in response to rotation of rotors 56, 58, and 60 will also move vertically (downward) in a direction parallel with rotation axis 62 concurrent with movement of the pills stepped spirally and/or radially away from rotation axis 62.

Figure 6:
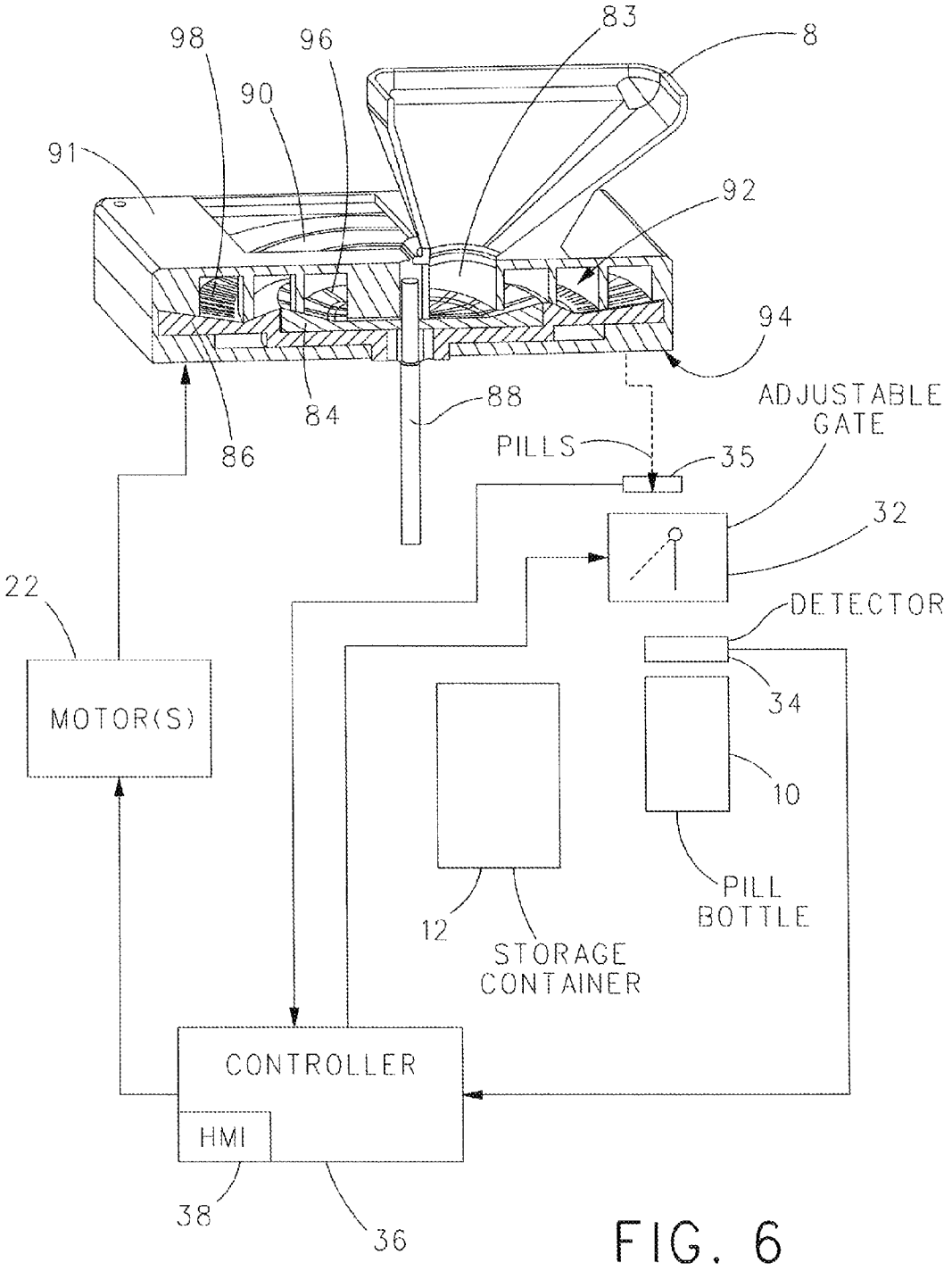
FIG. 6 is a partially open cross-sectional perspective view of a third embodiment cassette that can be utilized with a pill dispensing machine of FIG. 1 in operative relation to a block diagram of the operationally related components of the pill dispensing machine.

With reference to FIG. 6 and with continuing reference to FIGS. 1-5, a third embodiment cassette 82 that can be utilized with pill dispensing machine 2 in replacement of cassette 14 (FIGS. 2 and 3) and/or cassette 54 (FIGS. 4A, 4B, and 5) includes an opening 83 for feeding pills via chute 8 to a first rotor 84 disposed for rotation about a rotation axis 88 and a second rotor 86 disposed concentrically with first rotor 84 for rotation about first rotor 84 and rotation axis 88. As shown in FIG. 6, the pill receiving surface of first rotor 84 is generally flat adjacent rotation axis 88 and slopes upwardly with greater radially distance from rotation axis 88. The pill receiving surface of second rotor 86 initially slopes downward and then upward with greater radial distance from rotation axis 88. Desirably, the outside radius of rotor 84 and the inside radius of rotor 86 are at substantially the same height. However, this is not to be construed as limiting the invention. Desirably, under the control of one or more motors 22, first rotor 84 can be rotated at a first rotational speed and second rotor 86 can be rotated at a second, greater rotational speed.

Cassette 82 includes a spiral plate 90 supported in spaced relation over first and second rotors 84 and 86 by a cover 91 of cassette 82. The combination of spiral plate and first and second rotors 84 and 86 define a spiral path 92 that extends between a point adjacent rotation axis 88 and a discharge chute 94 of cassette 82.

Desirably, the edge of spiral plate 90 that is positioned in spaced facing relation with the pill receiving surfaces of first and second rotors 84 and 86 is shaped to track or follow the shapes/slopes of the pill receiving surfaces of first and second rotors 84 and 86.

Optionally, first rotor 84 includes radial grooves, indentations, or protrusions 96 and second rotor 86 includes radial grooves, indentations, or protrusions 98. Desirably, first rotor 84 includes a first number and/or density of radial grooves, indentations, or protrusions 96 and second rotor 86 includes a second, greater number and/or density of radial grooves, indentations, or protrusions 98. Radial grooves, indentations, or protrusions 96 and 98 avoid pills from rolling on the pill receiving surfaces of first and second rotors 84 and 86 during transport of the pills along spiral path 92 to discharge chute 94.

In operation of cassette 82, under the control of one or more motor(s) 22, first rotor 84 rotates pills entering opening 83 about rotation axis 88 along a first part of spiral path 92 at a first rotational speed whereupon the pills move spirally and radially away from rotation axis 88. Second rotor 86 receives the pills from first rotor 84 and rotates the pills about rotation axis 88 along a second part of spiral path 92 at a second, greater rotational speed, whereupon the pills move spirally and radially away from rotation axis 88. Because of the sloped surfaces of first and second rotors 84 and 86, pills moving along spiral path 92 away from rotation axis 88 will also move in a direction parallel with rotation axis 88, i.e., in an up direction and a down direction, concurrent with the first and second rotors 84 and 86 moving the pills radially away from rotation axis 88 along spiral path 92.

Figure 7:
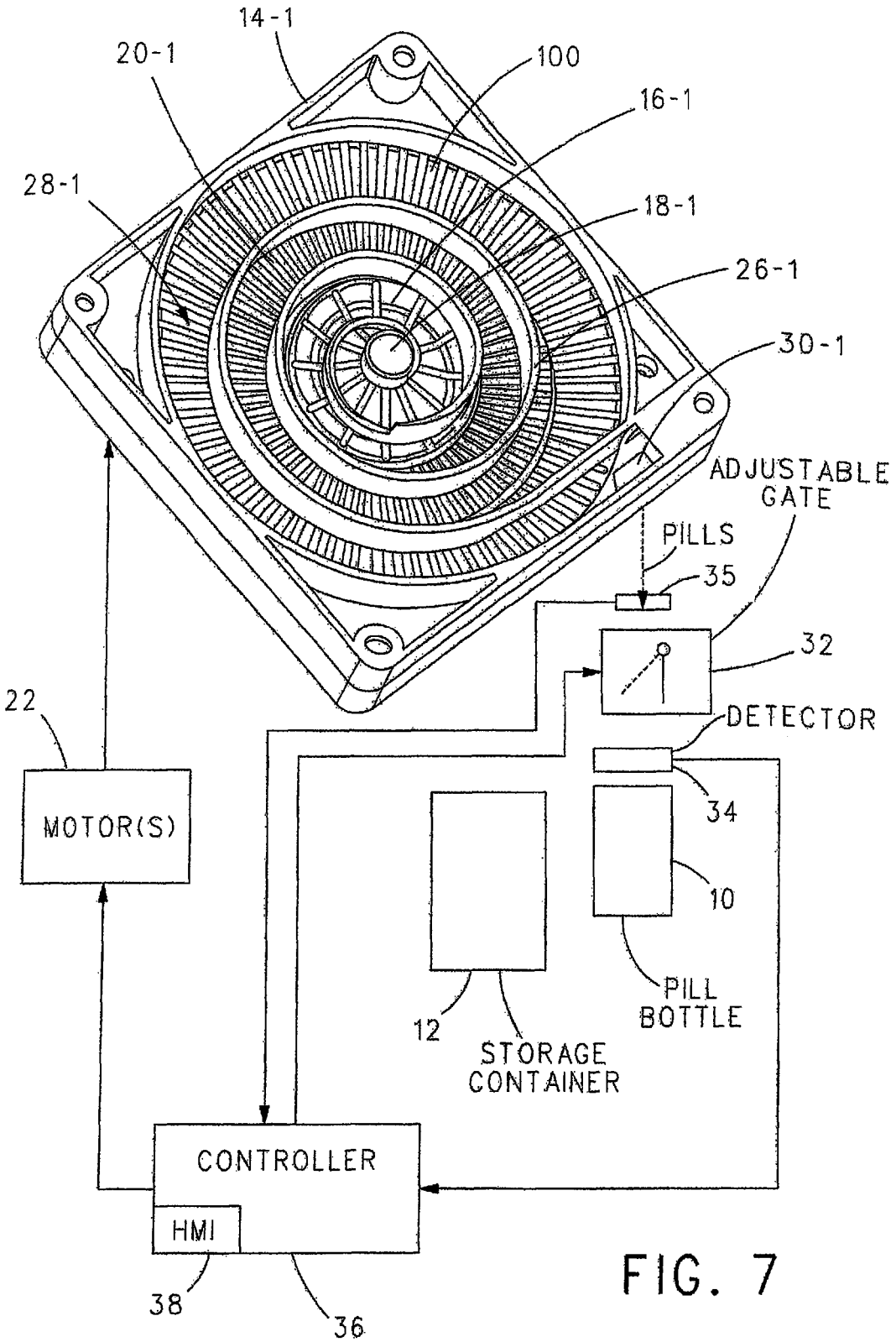
FIG. 7 is a modified version of the second embodiment cassette shown in FIGS. 2 and 3.

With reference to FIG. 7 and with reference back to FIGS. 2 and 3, a variation of the first embodiment cassette 14 (FIGS. 2 and 3) is shown in FIG. 7 as cassette 14-1. Cassette 14-1 includes a first rotor 16-1 disposed for rotation about a rotation axis 18-1, a second rotor 20-1 disposed for rotation about first rotor 16-1 and rotation axis 18-1, and third rotor 100 disposed for rotation about second rotor 20-1 and rotation axis 18-1. Cassette 14-1 includes a spiral plate 26-1 that is held in spaced facing relation to rotors 16-1, 20-1, and 100 via a cover (not shown) of cassette 14-1. The combination of spiral plate 26-1 and rotors 16-1, 20-1, and 100 define a spiral path 28-1 that extends between a first location at or adjacent rotation axis 18-1 and a second location at or adjacent a discharge port 30-1 of cassette 14-1.

Under the control of one or more motors 22, rotor 16-1 is rotated at a first rotational speed, rotor 20-1 is rotated at a second, greater rotational speed, and rotor 100 is rotated at a third rotational speed that is greater than the rotational speed of rotor 20-1. In response to rotation of rotors 16-1, 20-1 and 100 in this manner, pills introduced onto rotor 16-1 at or adjacent rotation axis 18-1 travel along spiral path 26-1 from a position adjacent rotation axis 18-1 to discharge chute 30-1. Essentially, the difference between cassette 14 (FIGS. 2 and 3) and cassette 14-1 (FIG. 7) is the addition of third rotor 100. Operationally cassette 14-1 can be used in replacement of any one of cassette 14, cassette 54 or cassette 82 in pill dispensing machine 2.

As can be seen from the foregoing, the pill dispensing machine (FIG. 1) can utilize the first embodiment cassette 14 (FIGS. 2 and 3), the second embodiment cassette 54 (FIGS. 4 and 5), the third embodiment cassette 82 (FIG. 6), or the alternate first embodiment cassette 14-1 (FIG. 7) to separate pills into a single line or queue that can be dispensed into a pill bottle 10 via adjustable gate 32, detector 34 and, if provided, optional detector 35 which provide(s) to controller 36 a count of pills entering pill bottle 10. Detector 35 provides to controller 36 an indication of each pill entering adjustable gate 32. Under the control of controller 36, adjustable gate 32 can be set to permit pills to enter pill bottle 10. Each pill entering pill bottle 10 is detected by detector 34 which supplies an indication thereof to controller 36 which maintains an aggregate count of pills entering pill bottle 10. At a suitable time after the number of pills dispensed into pill bottle 10 equals a desired number of pills to be dispensed into pill bottle 10, controller 36 causes adjustable gate 32 to redirect pills being discharged from the cassette to storage container 12. During the dispensing of pills, controller can utilize the count of pills detected by detectors 34 and 35 to confirm that the desired number of pills is dispensed into pill bottle 10. Once the desired number of pills have been dispensed into pill bottle 10 and adjustable gate 32 has been set to redirect pills into storage container 12, controller 36 can take the difference in the counts of pills detected by counter 35 after and during the filling of pill bottle 10 and the count detected by detector 34 during the filling of pill bottle 10 to obtain a count of the number of pills introduced into storage container 12.

The rotational speeds of the rotors of each embodiment cassette 14, 54, 82, and 14-1 can be controlled by one or more motors 22 operating independently (manually) or under the control of controller 36. The plurality of rotors of each cassette 14, 54, 82, and 14-1 can be rotated by a single motor through a set of fixed gears. Also or alternatively, each rotor of each cassette 14, 54, 82, and 14-1 can be rotated separately by a dedicated motor. In each embodiment cassette 14, 54, 82, and 14-1 outer rotors further away from the corresponding rotation axis are rotated faster than inner rotors thereby providing an effective way to separate pills into a single line or queue.

Figure 8:
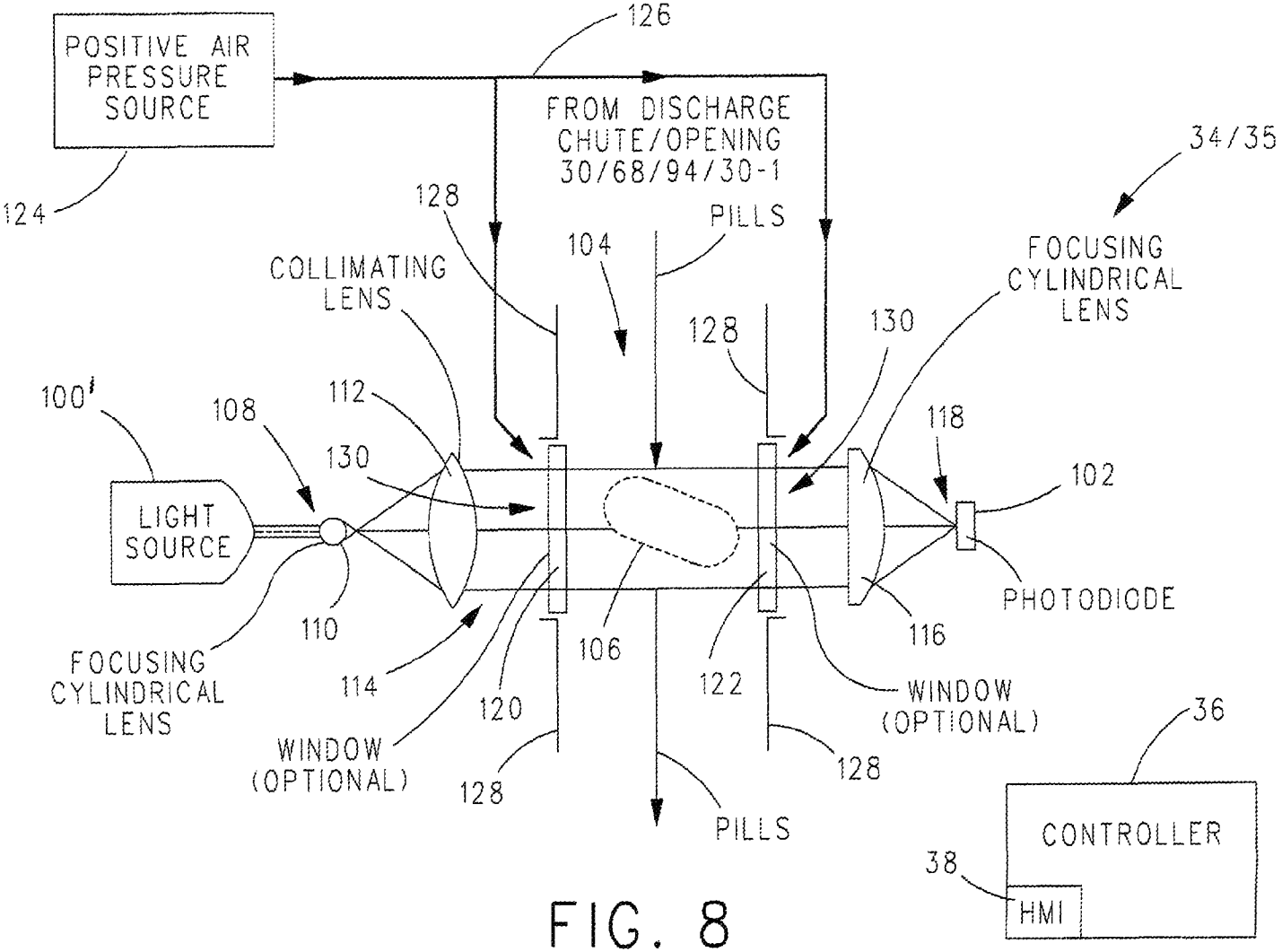
FIG. 8 is a schematic drawing of an embodiment detector for detecting each pill that passes therethrough.

With reference to FIG. 8, the combination of controller 36, and detector 34, detector 35, or both detectors 34 and 35, define a means for counting pills that exit discharge chute or opening 30, 68, 94, or 30-1. In this regard, detector 34, detector 35, or both, are part of pill dispensing machine 2 and can be utilized with any embodiment cassette 14, 54, 82, or 14-1 described above.

The preferred embodiment detector shown in FIG. 8, which can be utilized as detector 34, detector 35, or both, includes a light source 100', e.g., without limitation, a substantially spatially coherent light source, and a photodiode 102 positioned on opposite sides of a pill pathway 104 configured for the passage of one or more pills 106 that exit discharge chute/opening 30, 68, 94, or 30-1. Light source 100' can be a laser light source, such as a laser diode, an LED, or any other suitable and/or desirable substantially spatially coherent light source, or the combination of a light source and optical elements that can act as a substantially spatially coherent light source. Pill pathway 104 can be defined by one or more walls 128 and can be of any suitable and/or desirable length and/or geometry, such as, without limitation, cylindrical shaped.

A beam of light 108 output by light source 100' is converted by a first focusing cylindrical lens 110 and a collimating lens 112 into a beam of collimated light 114 that enters pill pathway 104 via openings 130 in walls 128 after exiting collimating lens 112.

After passage through pill pathway 104 and any pills 106 in the path of the beam of collimated light 114, said beam of collimated light 114 is focused onto photodiode 102 by a second focusing cylindrical lens 116. In an embodiment, photodiode can optionally include a pinhole aperture 118 to avoid light other than light coming from second focusing cylindrical lens 116 from impinging on photodiode 102. The use of pinhole aperture 118, however, is optional and is not to be construed in a limiting sense.

Optionally, windows 120 and 122 can be provided over openings 130 in the pathway of the beam of collimated light 114 on opposite sides of pill pathway 104 to avoid dust associated with pills 106 from entering and obscuring light source 100', photodiode 102, and/or one or more of lenses 110, 112, and 116. Each window 120 and 122 can be made of glass or similar transparent material that facilitates the distortion free passage of the beam of collimated light 114 therethrough. Alternatively, windows 120 and 122 can be omitted (whereupon openings 130 are uncovered) and replaced by a positive air pressure source 124 and associated ductwork 126 to supply air under positive pressure to openings 130. The pressurized air passing through openings 130 avoids dust from entering and obscuring light source 100', photodiode 102, and/or one or more of lenses 110, 112, and 116.

The use of the embodiment detector shown in FIG. 8 as a spatial filter to facilitate the counting of pills 106 passing along pill pathway 104 will now be described.

In the absence of a pill 106 passing through the beam of collimated light 114, second focusing cylindrical lens 116 focuses the beam of collimated light 114 onto photodiode 102. In response to a pill 106 passing through the beam of collimated light 114 in pill pathway 104, the amount of light that reaches photodiode 102 momentarily changes, i.e., decreases. This momentary change in the amount of light reaching photodiode 102 results in a decrease in current output by photodiode 102, which decrease in output current is sensed by controller 34 in a manner known in the art over the amount of current output by photodiode 102 in response to no pill 106 passing through the beam of collimated light 114 in pill pathway 104.

More specifically, in response to a pill 106 passing through the beam of collimated light 114 in pill pathway 104, the amount of light that reaches photodiode 102 momentarily changes, i.e., decreases. In the case of an opaque pill part of the beam power is blocked or absorbed by the pill. In the case of a transparent pill such as fish oil capsule the light passing though the pill is distorted changing its direction of propagation. Optical filtering blocks this redirected part of the beam from entering the aperture of the photodiode resulting in reduced intensity of the received beam that can be detected by the processing circuitry. This approach allows reliable detection of pills regardless of their transparency.

Controller 36 can be programmed to accumulate a count of each decrease in a predetermined amount of current output by photodiode 102 in response to a pill 106 passing through the beam of collimated light 114 in pill pathway 104 as a count of the total number of pills 106 passing through the detector shown in FIG. 8.

When an instance of the detector shown in FIG. 8 is utilized as detector 34, controller 36 can accumulate a count of pills 106 dispensed into pill bottle 10. When an instance of the detector shown in FIG. 8 is utilized as detector 35 in combination with detector 34, an accumulated count of the total number of pills being dispensed from discharge chute/opening 30, 68, 94, or 30-1 and detected by detector 35 can be subtracted from the accumulated count of pills detected by detector 34 (dispensed into pill bottle 10) to determine the total number of pills dispensed into storage container 12. Detectors 34 and 35 can also or alternatively be used in series to confirm the number of pills dispensed directly into pill bottle 10.

It is envisioned that pill counter 2 can include another gate (not shown) in the form of a mechanical shutter located between discharge chute/opening 30, 68, 94, or 30-1 and adjustable gate 32. This other gate can be closed during movement of adjustable gate 32 from dispensing pills into pill bottle 10 to dispense pills to storage container 12 to avoid pills from entering adjustable gate 32 during said movement and inadvertently being dispensed into pill bottle 10.

Where the dispensing of pills into chute 8 via hopper 9 (FIGS. 4A, 5 and 6) is controlled by controller 36, the speed at which pills are dispensed into chute 8 by hopper 9 can be controlled by controller 36 in response to detecting pills on the innermost rotor. For example, when pills are detected [via a suitable sensor (not shown), such as, without limitation, a photodetector] on the innermost rotor, controller 36 can slow down or stop the dispensing of pills into chute 8 thereby avoiding pills from piling up and overwhelming the counting system.

The speed of the outermost rotor can also be controlled by controller 36 according to the output of a suitable sensor (not shown), such as, without limitation, a photodetector. When a pill is detected on the outermost rotor near the edge of the discharge chute or opening by the sensor, the rotation of the outermost rotor can be slowed by controller 36 to avoid pills from overwhelming detector 34, detector 35, or both.

Lastly, the sensor detecting the presence of a pill near the edge of the discharge chute or opening can also or alternatively be utilized to measure the size of the counted pills. Based on this size, the overall speed of the rotors can be adjusted for optimum speed and counting accuracy. This sensor can also or alternatively be replaced by an imaging sensor, such as a video chip and image recognition associated with controller 36 to permit faster and more accurate speed control.

This invention has been described with reference to exemplary embodiments. Obvious modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A pill dispensing machine comprising:

a cassette including a first rotor disposed for rotation about a rotation axis, a second rotor disposed for rotation about the first rotor and the rotation axis, and a discharge chute or opening;

at least one motor for rotating the first rotor at a first speed and for rotating the second rotor at a second, faster speed;

one or more plates spaced [from] *directly over* the first and second rotors and defining therewith a spiral path at least partially about the rotation axis that extends between a first location at or adjacent the rotation axis and a second location at or adjacent the discharge chute; and means for counting pills that exit the discharge chute comprising:

a light source and a photodiode positioned on opposite sides of a pill pathway;

a collimating lens for collimating light output by the light source and for passing the collimated light to the pill pathway;

a focusing lens for focusing light exiting the pill pathway onto the photodiode; and a controller programmed to be responsive to changes in an amount of the focused light received by the photodiode in response to the passage of pills through the collimated light in the pill pathway for accumulating a count of pills that pass through the collimated light in the pill pathway.

2. The pill dispensing machine of claim 1, further including:

the first rotor having a first density of radial grooves, indentation or protrusions; and the second rotor having a second, greater density of radial grooves, indentations, or protrusions.

3. The pill dispensing machine of claim 1, further including:

the first rotor having a conical or convex pill receiving surface that slopes downward in the direction of the discharge chute or opening with greater radial distance from the rotation axis; and the second rotor having a conical or convex pill receiving surface that slopes downward in the direction of the discharge chute or opening with greater radial distance from the first rotor.

4. The pill dispensing machine of claim 3, further including a step between the conical or convex pill receiving surface of the first rotor and the conical or convex pill receiving surface of the second rotor.

5. The pill dispensing machine of claim 1, wherein the one or more plates include a plurality of plates arranged such that the spiral path is a stepped spiral path.

6. The pill dispensing machine of claim 1, further including:

the first rotor having a pill receiving surface that includes a slope; and the second rotor having a concave pill receiving surface that includes a slope.

7. A pill dispensing machine comprising:

a plurality of concentric rotors having pill receiving surfaces;

at least one motor for rotating the plurality of concentric rotors at different rotational speeds about a rotation axis;

at least one plate spaced [from] *directly over* the pill receiving surfaces of the plurality of concentric rotors and defining with said pill receiving surfaces all or part of a spiral path at least partially around the rotation axis which extends between the innermost rotor and the outermost rotor;

a discharge chute or opening adjacent the outermost rotor from the rotation axis; and means for counting pills that exit the discharge chute or opening, said means for counting including:

a light source and a photodiode positioned on opposite sides of a pill pathway;

a collimating lens for collimating light output by the light source and for passing the collimated light to the pill pathway;

a focusing lens for focusing light exiting the pill pathway onto the photodiode; and a controller responsive to changes in an amount of the focused light received by the photodiode due to the passage of pills through the collimated light in the pill pathway for accumulating a count of pills that pass through the collimated light in the pill pathway.

8. The pill dispensing machine of claim 7, further including each rotor having radial grooves, indentations, or protrusions.

9. The pill dispensing machine of claim 7, further including each rotor having a different number and/or density of radial grooves, indentations, or protrusions, with each outer rotor having a different number and/or density of radial grooves, indentations, or protrusions than each inner rotor.

10. The pill dispensing machine of claim 7, further including the plurality of concentric rotors defining conical or convex pill receiving surfaces that slope downward with greater radial distance from the rotation axis.

11. The pill dispensing machine of claim 10, further including a step between each pair of conical or convex pill receiving surfaces.

12. The pill dispensing machine of claim 7, wherein the pill dispensing machine includes a plurality of plates arranged such that the spiral path is a stepped spiral path.

13. The pill dispensing machine of claim 7, further including a feed chute disposed for feeding pills to the rotor radially closest to the rotation axis.

14. The pill dispensing machine of claim 7, the pill receiving surface of at least one rotor slopes upwardly, downwardly, or both upwardly and downwardly at different points radially from the rotation axis.

15. A method of pill dispensing comprising:

(a) a first rotor rotating pills about a rotation axis along a first part of a spiral path at least partially around the rotation axis at a first rotational speed whereupon the pills move spirally away from the rotation axis;

(b) a second rotor receiving the pills from the first rotor and rotating the pills about the rotation axis along a second part of the spiral path at least partially around the rotation axis at a second, greater rotational speed whereupon the pills move spirally away from the rotation axis, *wherein the first and second parts of the spiral path are defined by one or more plates spaced directly over the first and second rotors*;

(c) following step (b), feeding the pills to a discharge chute or opening; and (d) following step (c), accumulating a count of pills that pass through a beam of collimated light after exiting the discharge chute or opening.

16. The method of claim 15, further including the first and second rotors having pill receiving surfaces that are shaped whereupon the pills move parallel with the rotation axis concurrent with the first and second rotors moving the pills spirally away from the rotation axis.

17. The method of claim 15, wherein the spiral path is a stepped spiral path whereupon the pills move in a stepped spiral away from the rotation axis.

*18. The method of claim 15, wherein the one or more plates includes a spiral plate.*

*19. The method of claim 15, wherein the one or more plates includes an arcuate plate.*

* * * * *